United States Patent

McCalip et al.

[11] Patent Number: 5,531,832
[45] Date of Patent: Jul. 2, 1996

[54] NOZZLE ASSEMBLY FOR PAN OILER

[75] Inventors: Timothy I. McCalip, Lindsay; Jimmy R. Frazier; John E. Fagan, both of Norman, all of Okla.

[73] Assignee: Burford Corporation, Maysville, Okla.

[21] Appl. No.: 215,050

[22] Filed: Mar. 18, 1994

Related U.S. Application Data

[63] Continuation-in-part of Ser. No. 370,290, Jun. 22, 1989, abandoned, which is a continuation-in-part of Ser. No. 231,588, Aug. 8, 1988, Pat. No. 4,925,699, which is a continuation of Ser. No. 937,961, Dec. 4, 1986, abandoned, which is a continuation-in-part of Ser. No. 796,083, Nov. 7, 1985, abandoned.

[51] Int. Cl.⁶ ..................................................... B05B 5/00
[52] U.S. Cl. ........................... 118/622; 118/623; 118/624; 118/631; 118/638; 118/671; 118/677; 118/682; 118/684; 118/685; 118/703; 118/712; 118/DIG. 8; 239/695; 239/708
[58] Field of Search .............................. 118/DIG. 8, 675, 118/676, 679, 682, 684, 685, 611, 619, 630, 636, 638, 324, 703, 671, 696, 17, 24, 623, 624, 631, 677, 712; 427/28, 29, 32, 33, 479, 480, 483; 239/691, 696, 695, 708

[56] References Cited

U.S. PATENT DOCUMENTS

| | | | |
|---|---|---|---|
| 2,453,527 | 11/1948 | Mero | 118/682 |
| 2,526,763 | 10/1950 | Miller | 118/630 |
| 2,633,820 | 4/1953 | Koerber | 118/685 |
| 2,696,449 | 12/1954 | Ericks et al. | 427/424 |
| 2,754,227 | 7/1956 | Rausburg | 118/622 |
| 2,764,508 | 9/1956 | Feick | 239/696 |
| 2,884,338 | 4/1959 | Jenison | 427/32 |
| 2,888,362 | 5/1959 | Starkey | 427/29 |
| 2,955,565 | 10/1960 | Schotland | 118/696 |
| 3,065,106 | 11/1962 | Rhodes et al. | 427/28 |
| 3,641,971 | 2/1972 | Walberg | 118/671 |
| 3,969,124 | 7/1976 | Stewart | 252/511 |
| 4,186,886 | 2/1980 | Sickles | 239/691 |
| 4,237,441 | 12/1980 | Van Konynenburg et al. | 252/511 |
| 4,313,968 | 2/1982 | Sickles et al. | 427/27 |
| 4,470,835 | 9/1984 | Fecik et al. | 65/106 |
| 4,599,262 | 7/1986 | Schulte et al. | 264/212 |
| 4,832,880 | 5/1989 | Staniforth | 264/22 |
| 4,925,699 | 5/1990 | Fagan | 427/28 |
| 5,110,616 | 5/1992 | Lair et al. | 427/9 |

*Primary Examiner*—Laura Edwards
*Attorney, Agent, or Firm*—Crutsinger & Booth

[57] ABSTRACT

A pan oiler for spraying oil into cavities in pans moving on a conveyor including a stationary center nozzle assembly and spaced outer nozzle assemblies. The outer nozzle assemblies are mounted on opposite ends of a drive screw having right hand threads formed on one end and left hand threads formed on the other end for moving the outside nozzle assemblies in unison relative to the stationary center nozzle assembly. A pair of electrically charged electrodes are positioned adjacent the nozzle assemblies for setting up an electric field across the spray paths of the nozzle assemblies for reducing overspray.

11 Claims, 6 Drawing Sheets

NOZZLE ASSEMBLY FOR PAN OILER

CROSS REFERENCE TO RELATED APPLICATIONS

This application is a continuation-in-part of commonly owned application Ser. No. 07/370,290 filed Jun. 22, 1989, now abandoned entitled "SPRAYER," which is a continuation-in-part of commonly owned application Ser. No. 07/231,588 filed Aug. 8, 1988, now U.S. Pat. No. 4,925,699 entitled "Sprayer," the disclosure of which is incorporated herein by reference in its entirety, which was a continuation of application Ser. No. 06/937,961, filed Dec. 4, 1986 entitled "Sprayer" (now abandoned), which was a continuation-in-part of application Ser. No. 06/796,083, filed Nov. 7, 1985 entitled "Sprayer" (now abandoned).

TECHNICAL FIELD

The invention disclosed herein relates to a spray system in combination with a sequence control system for applying cooking oil to surfaces of baking pans or for applying oil, butter or other materials to surfaces of food products.

BACKGROUND OF INVENTION

The tremendous variety of baking pans used in commercial baking and the frequent requirement that a single oiler and pan sensor arrangement work with several different pans presents two major challenges. The first is to produce a pattern of sprays which gives a light, evenly distributed coating of release agent only on those portions of the pan which contact the baked product. The second is to consistently synchronize or align the spray pattern with moving pans.

Further, liquid sprayed through nozzles tends to form a very fine mist commonly referred to as "overspray" which does not adhere to the surface of the pan and results in contamination of the atmosphere in the vicinity of the pan or application of oil to surfaces around the pan.

Sequence control apparatus heretofore employed for controlling bakery pan oilers have limited capability for applying precisely controlled quantities of liquid to precisely controlled areas on pan or conveyor band surfaces. Consequently, the systems tend to apply excessive quantities of oil or other materials which detracts from the quality of the resulting food product and requires excessive maintenance and cleaning to operate the systems.

Current systems for the application of oils and other release agents to pans used for commercial baking (commonly referred to as "oilers" or "greasers") provide very limited control of application patterns. Pan sensing is frequently a problem with these systems as well. Consequently, these systems are unable to oil some types of pans and, they give poor results with many other pans. A sequence controller capable of extending the spray pattern capabilities of such systems and adapted to sense the location of a pan without using special sensors is needed.

Commercial pan oilers apply a release agent such as vegetable oil to the baking pan using one or more spray nozzles. The nozzles are usually mounted above a pan conveyor and spray into the pans as they pass below. Most oilers are designed for use with pans that have well defined cavities in a uniform rectangular arrangement. A typical nozzle configuration uses a selected number of nozzles positioned in a row across the pan conveyor. Each nozzle is individually adjusted along a track to match nozzle spacing to the cavity spacing of various pans.

A pan sensor is normally mounted below the conveyor to sense the bottom profile of the pan. When the sensor detects the leading edge of each cavity, it triggers a short spray from all selected nozzles. The position of the spray within each cavity is determined by the position of the pan sensor relative to the nozzle line.

Pan sensor position is usually adjusted to trigger a spray in the center of each cavity. Spray duration is adjusted to control the amount of release agent applied per spray cycle. Since spray tips commonly used give relatively high flow rates, the maximum spray duration is typically less than a tenth of a second and, the pan travels only a few tenths of an inch along the conveyor during the spray cycle. This gives the effect of spraying a single shot or burst of oil into each cavity.

The current systems are limited because they only spray when a signal is received from the pan sensor. This means that a consistently detectable pattern of features must exist on some profile of the pan which exactly matches the desired pattern of sprays.

Most pan sensors in use are either the metal detecting proximity type or the optical proximity type. These sensors are on if they detect a sufficient amount of metal or a sufficient optical path. Because they are either on or off, and because they are only sensitive to a single characteristic of the pan, they are most effective where a high contrast profile exists. Bent pans, which are common in the industry, can cause the sensors to miss sprays. Also, many commercial baking pans have frames, braces, and unusual geometries which will cause misses or extra sprays.

SUMMARY OF INVENTION

The nozzle assembly disclosed herein may be used as a replacement nozzle for existing machines or as a part of a new machine. Pan oilers, water splitters and butter applicators are commercially available from Burford Corp. of Maysville, Okla. The Burford Hydroplate® Breadpan Oiler Model 7000 Right hand and 7100 Left hand model are suitable devices for use in conjunction with the nozzle assembly and sequence controller described herein.

The sequence controller disclosed herein is particularly adapted to provide spray pattern flexibility and minimize pan sensing problems. It allows spray pattern programming and only requires that the pan sensor detect a single synchronizing feature of the pan for each pattern of sprays produced.

The pan oiler for spraying oil into cavities in pans moving on a conveyor disclosed herein includes a frame mounted adjacent the conveyor; a center nozzle assembly the frame; first and second outside nozzle assemblies mounted on the frame; and a drive screw mounted on the frame and connected to the first and second outside nozzle assemblies. The drive screw has right hand and left hand threads for moving the first and second outside nozzle assemblies in unison relative to the center nozzle assembly.

A gear box is connected to the drive screw and a shaft, connected to said gear box, has a crank rotatable for moving the first and second outside nozzle assemblies relative to the center nozzle assembly for positioning the nozzle assemblies relative to the pans or food products.

Spaced electrodes on the frame are electrically charged and positioned to establish an electric field in a path between the nozzle assemblies and the pan surface to prevent overspray.

The sequence controller is a self contained, microprocessor based unit which provides a user programmable sequence of electronic pulses for the control or synchronization of valves, relays, solenoids, and timers. Each pulse sequence is initiated either by an external sensor or by a front panel switch. The sequence controller allows a single sensor pulse or switch closure to trigger a series of evenly timed events. The standard sequence controller is housed in a 10"×8"×4" NEMA 13 enclosure which can be readily mounted to an oiler or a conveyor. It is connectable in-line between a pan sensor and an oiler and uses the low voltage DC power provided by the oiler for sensor operation and, therefore, does not require external power input.

The invention described herein incorporates an improved method of forming a thin film of liquid release agent on the surface of a pan which is particularly adapted for use in commercial bakeries. A mass of release agent is atomized by forcing the liquid through a nozzle to form small droplets which are propelled between a pair of positively charged electrodes to ionize the droplets by stripping electrons from the droplets, in the case of a release agent that is conducting, or readily ionizable. Prior to atomizing the liquid, it may be heated to adjust the viscosity and mixed with sodium chloride for increasing the conductivity of the liquid. The ionized droplets are sprayed onto the surface of a cooking pan for forming a film on the surface.

For spraying cooking oils that are nonconducting, or dielectric, the droplets are said to become electrically polarized, and the electrodes may be charged either positively or negatively. However, they must be shaped such that the electric field intensity in their vicinity is not too great, as would be the case with electrodes having a small radius of curvature.

The apparatus for carrying out the improved method comprises a pan sensor interfaced with the sequence controller for energizing a valve driver for directing a spray of droplets between charged electrodes in a timed sequence to cause the charged droplets to be attracted to and impinge against a grounded surface of a pan on a conveyor.

DESCRIPTION OF THE DRAWINGS

Drawings of a preferred embodiment of the invention are annexed hereto so that the invention may be better and more fully understood, in which.

Like numeral references are employed to designate like parts throughout the various figures of the drawing.

DESCRIPTION OF A PREFERRED EMBODIMENT

Figure 1:
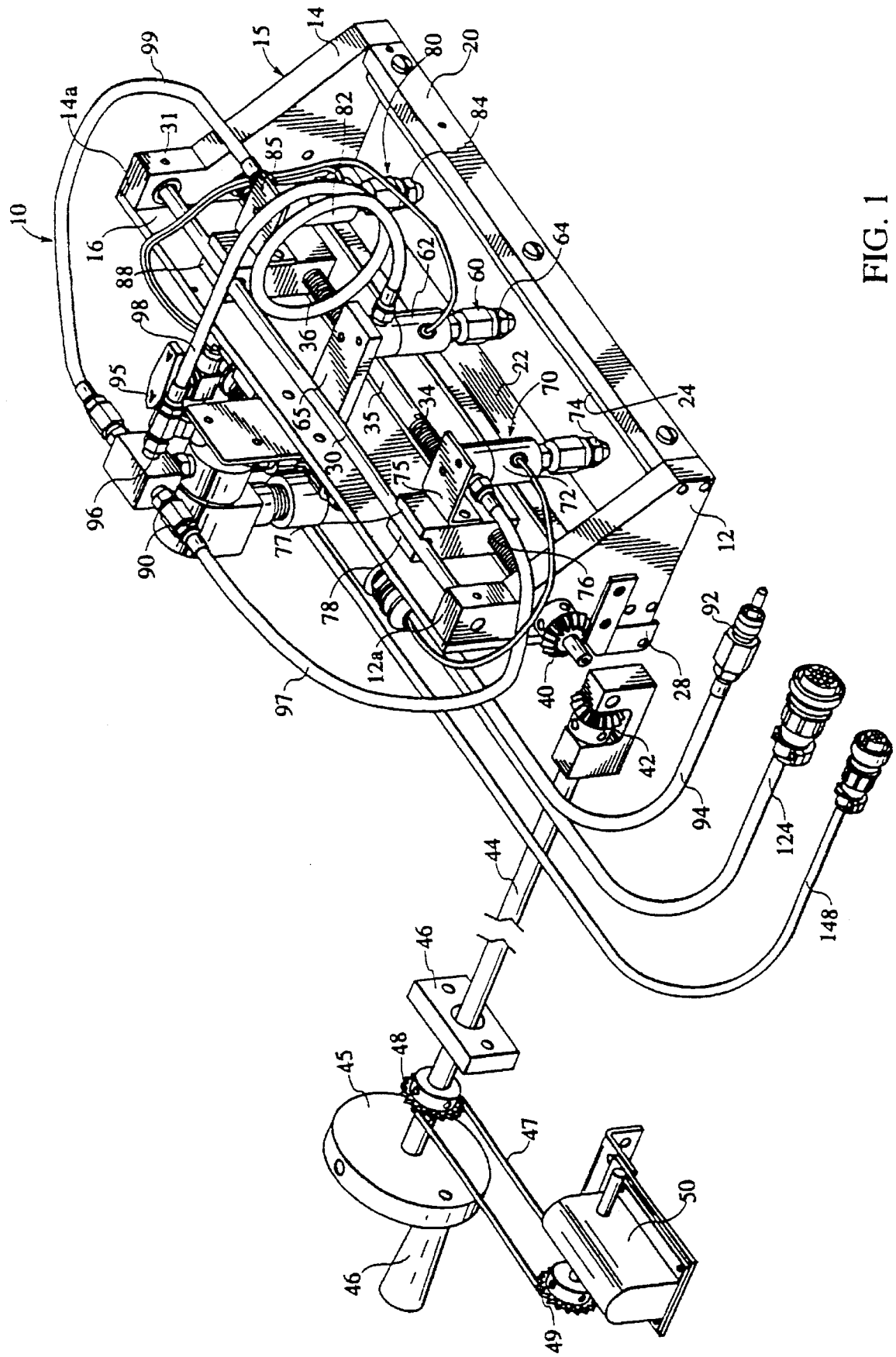
FIG. 1 is a perspective view of a pan oiler.

Referring to FIG. 1 of the drawing, the numeral 10 generally designates an electrostatic spray system for use as a pan oiler for applying cooking oil to surfaces of baking pans or for applying oil, butter or other materials to surfaces of food products. The spray system 10 has a frame assembly 15 formed of material which is not electrically conductive, such as polyethylene or other plastic materials. The frame assembly incorporates two high voltage electrodes 22 and 24 and associated electrical wiring for establishing an electrical field across a spraying path between the two high voltage electrodes.

The frame assembly 15 includes first and second side frames 12 and 14 having a front plate 16 and tie bars 18 and 20 extending therebetween. Screws 17 extend through front plate 16 and secure opposite ends of front plate 16 to side frames 12 and 14. Screws 19 extend through side frames 12 and 14 into opposite ends of the front tie bar 18 and screws 21 extend through side frames 12 and 14 into opposite ends of the rear tie bar 20.

A front electrode 22 is secured by screws 23 to front tie bar 18. A rear electrode 24 is secured by screws 25 to the rear tie bar 20. Electrodes 22 and 24 are preferably formed of electrically conductive material, such as polycarbonate or other suitable conductive plastic material.

A pan guide roller 26 extends across the lower end of frame assembly 15 and has opposite ends rotatably secured in bearing blocks 28 and 29. Roller 26 is located at the infeed end of the nozzle assembly to help any pans that might be bouncing upward pass under the nozzles. The roller 26, preferably formed of non-conductive material, is a rolling pan guide for the nozzle assemblies and preferably spaces electrodes 22 and 24 about ⅝ of an inch from the upper surface of the pan.

Figure 3:
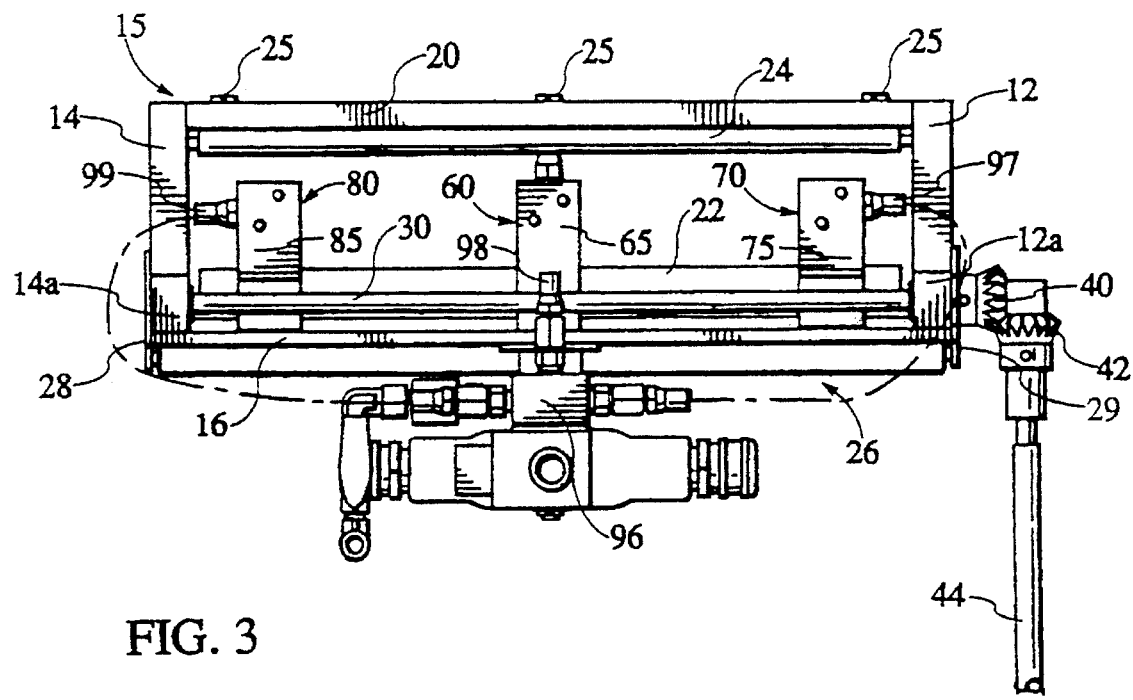
FIG. 3 is a top plan view.
Figure 2:
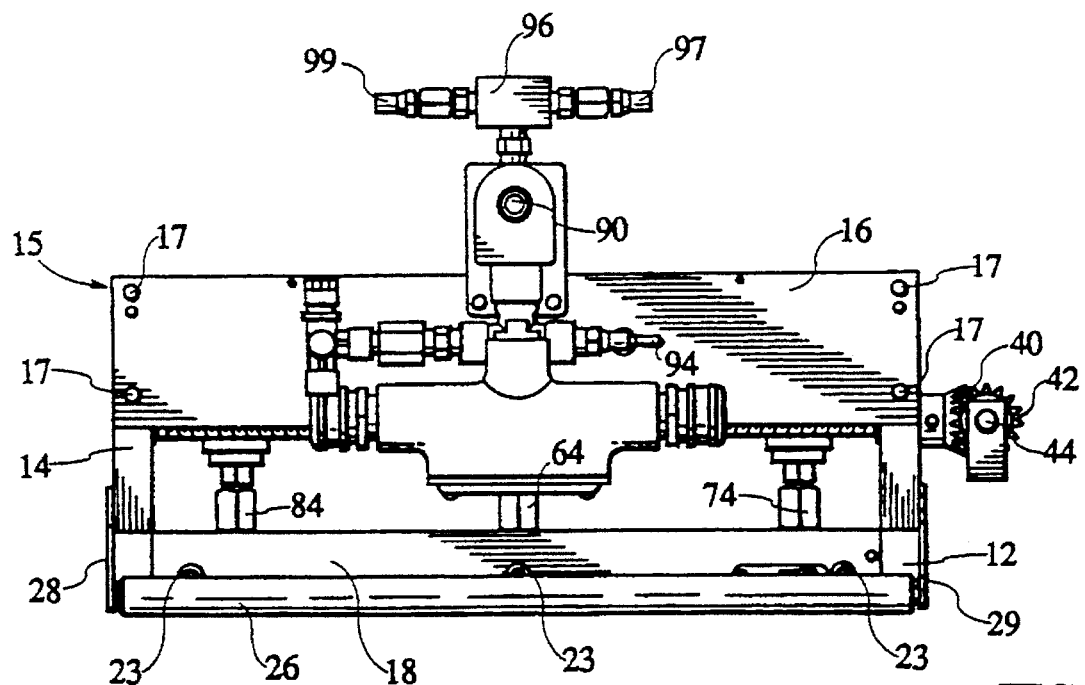
FIG. 2 is an elevation view of the front or infeed end of the oiler.
Figure 5:
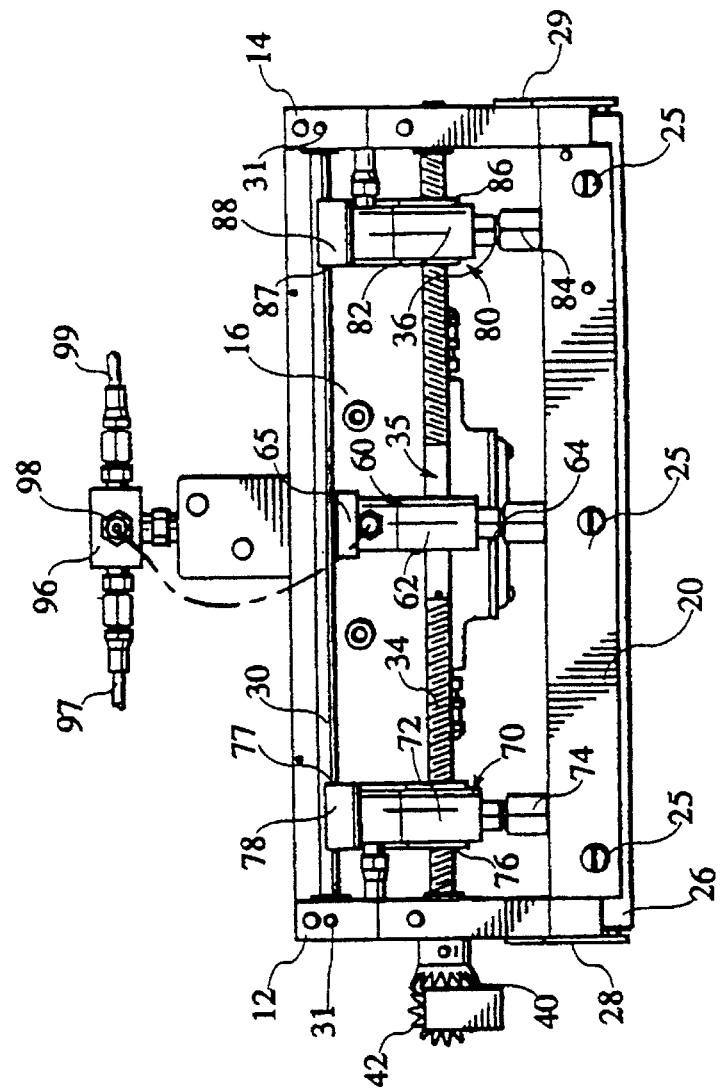
FIG. 5 is a rear elevational view.

As best illustrated in FIGS. 1, 3 and 5 of the drawing, a guide rail 30 extends between side frames 12 and 14 and has opposite ends secured in openings in lugs 12a and 14a on side frames 12 and 14 by set screws 31.

Opposite ends of a drive screw 35, having threaded ends 34 and 36, extend through openings formed in side frames 12 and 14. One end 34 of drive screw 35 has right-hand threads formed thereon while the other end 36 of drive screw 35 has left-hand threads formed thereon.

A portion 38 of drive screw 35 extends through side frame 12 and has a bevel gear 40 mounted on the end thereof. A second bevel gear 42 is mounted on a shaft 44 having a crank 45 mounted on the other end thereof. Shaft 44 extends through a bearing 46 and has a sprocket 48 secured thereto.

A mechanical counter 50 with a digital readout has a sprocket 49 mounted thereon. A Chain 47 extends around sprockets 48 and 49. As will be hereinafter more fully explained, rotation of crank 45 imparts rotation through sprocket 48, chain 47 and sprocket 49 to the counter 50. The digital readout on counter 50 indicates the rotary position of shaft 44.

As best illustrated in FIGS. 1 and 5 of the drawing, a plurality of nozzle assemblies 60, 70 and 80 are mounted between side frames 12 and 14. The central nozzle assembly 60 comprises a valve 62 and an adjustable spray tip 64 mounted on a bracket 65 secured to a central portion of front plate 16.

Two outside nozzle assemblies 70 and 80 are mounted for reciprocal movement along guide rail 30 by drive screw 35. The first outside nozzle assembly 70 includes a valve 72 and spray tip 74 mounted on a bracket 75. Bracket 75 is mounted on a carriage 78 having a threaded opening 76 and a guide yoke 77 formed thereon.

The threaded end 34 of drive screw 35 extends through a threaded opening 76 in carriage 78 and guide rail 30 extends through a groove in yoke 77 such that rotation of drive screw 35 moves carriage 78 transversely of frame 15 and the carriage is restrained against rotation by guide rail 30.

The second outside nozzle assembly 80 comprises a valve 82 and spray tip 84 mounted on a bracket 85. Bracket 85 is mounted on a carriage 88 having a threaded passage 86 and a yoke 87. The end 36 of threaded drive screw 35 extends through the threaded opening 86 in carriage 88 and yoke 87 engages guide rail 30 to prevent rotation of carriage 88.

From the foregoing, it should be readily apparent that rotation of drive screw 35, having right and left-hand threads formed on opposite ends 34 and 36, imparts movement to carriage 78 in one direction and movement to carriage 88 in the opposite direction. Thus, if drive screw 35 is rotated in a clockwise direction carriage 78 and carriage 88 will move toward the center nozzle assembly 60. However, if drive screw 35 is rotated in a counter-clockwise direction, carriage 78 and carriage 88 will move simultaneously outwardly toward side frames 12 and 14 and away from the center nozzle assembly 60.

The oil supply to each nozzle assembly 60, 70 and 80 is through one master valve 90 on the upper side of the spray system 10. This valve is normally closed, held open in the operating mode and supplies oil through a header 96 and oil lines 97, 98 and 99 to three individual nozzles. Oil is fed to the valve 90 through a quick disconnect oil line fitting 92 on stainless steel braided hose 94 with Teflon® coating. This quick disconnect fitting 92 fits into the bulk head of the existing Hydroplate® oiler 509, illustrated in FIGS. 8 and 9. Oil is transferred from the master valve 90 through the stainless steel braided hose 94 to each individual nozzle and valve assembly 60, 70 and 80. The valves 62, 72 and 82 are normally open, held closed.

A manual petcock valve 95 is included on the nozzle assembly for purging any air from the system.

Figure 6:
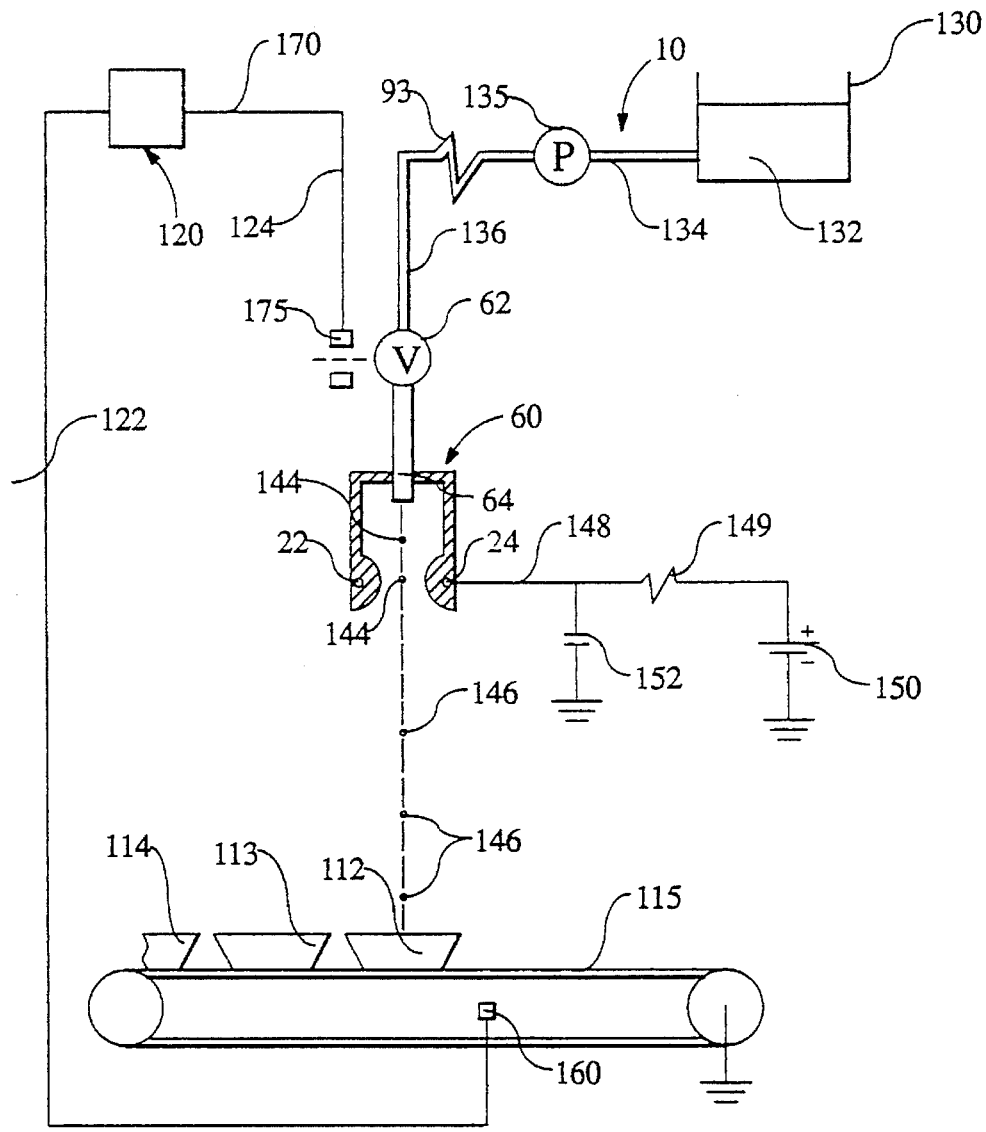
FIG. 6 is a schematic view of the spray system in relation to cooking pans carried on a conveyor.

An inline oil heater 93, illustrated in FIG. 6, is included to heat the oil as it is traveling to the main valve 90. This is an inline oil heater heating only the oil on the inside of the oil line.

Referring to FIG. 6 of the drawings, the numeral 60 generally designates an electrostatic sprayer assembly in a pan oiler 10, of the type disclosed in U.S. application Ser. No. 07/231,588 now U.S. Pat. No. 4,925,699 for applying a film of oil to pans 112, 113 and 114 carried on a conventional conveyor 115, for example in a commercial bakery. Sprayer assembly 10 is controlled by a sequence controller generally designated by the numeral 120 to initiate and terminate spraying cycles in timed sequence with arrival and departure of pans 112, 113 and 114, as disclosed in copending application Ser. No. 07/878,739, now U.S. Pat. No. 5,366,553 filed May 5, 1992, entitled "SEQUENCE CONTROLLER," the disclosure of which is incorporated herein by reference.

Figure 8:
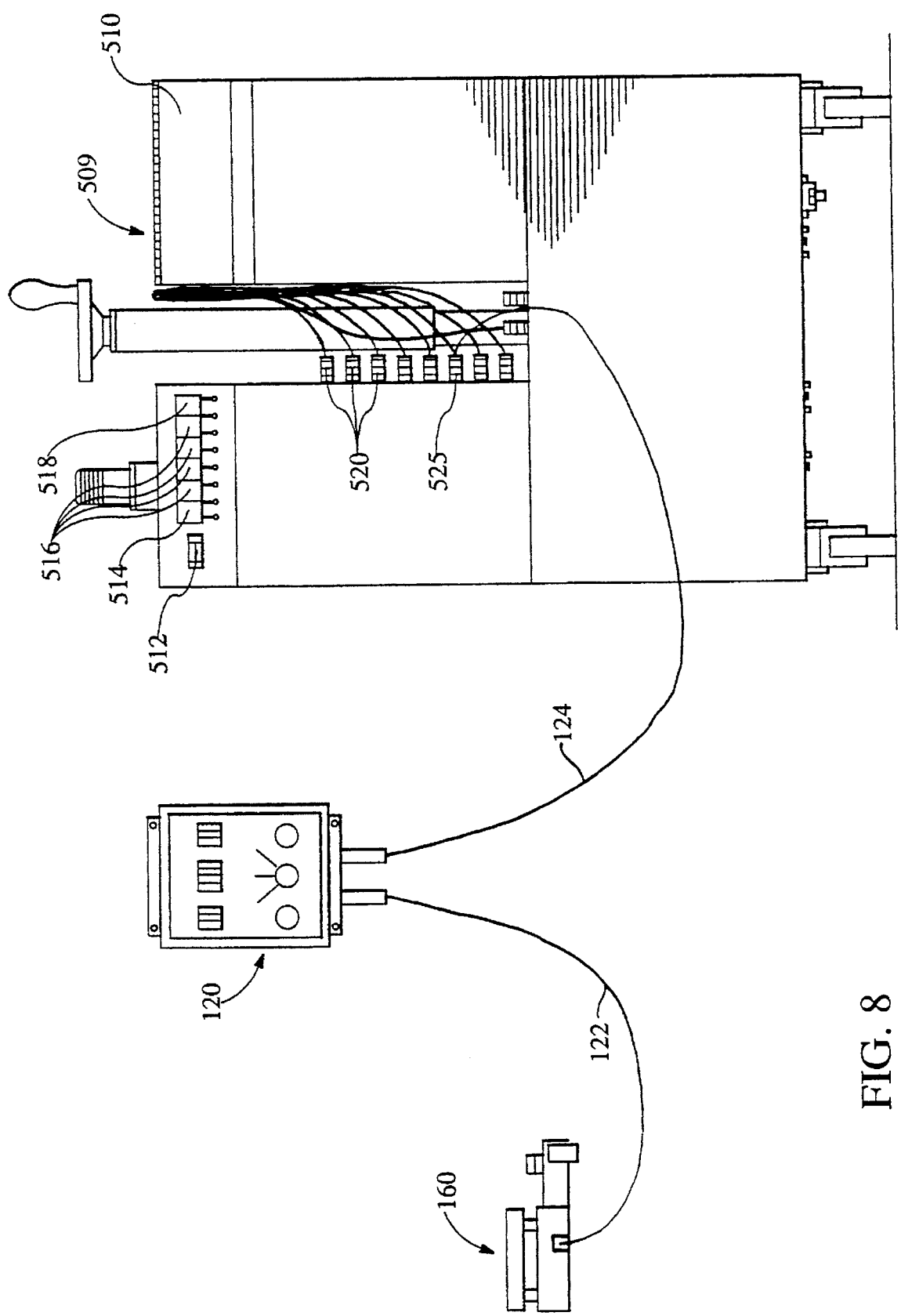
FIG. 8 is a diagrammatic view of a spray system, sequence controller and a pan sensor.
Figure 9:
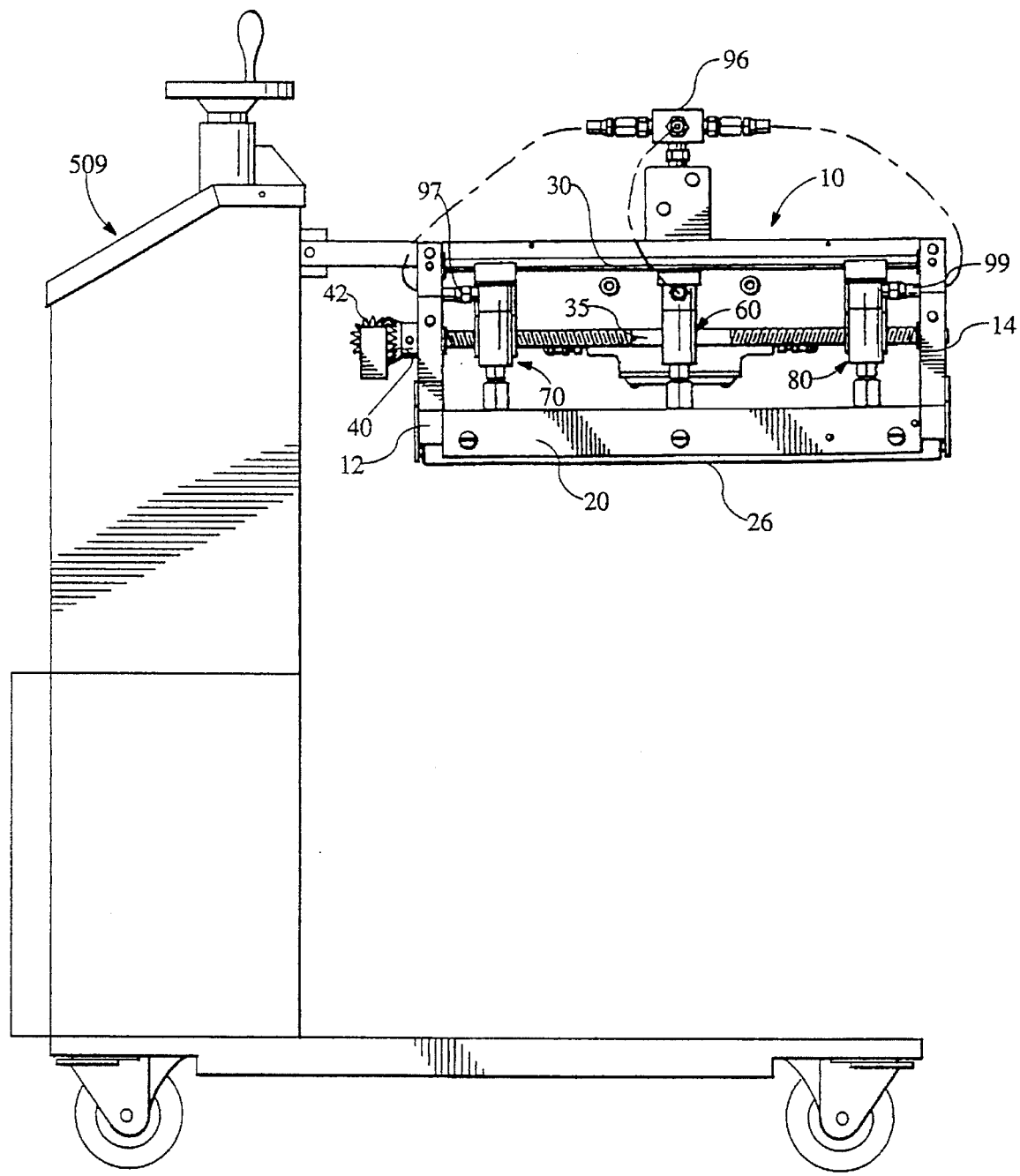
FIG. 9 is an elevational view of the spray system illustrated in FIG. 8 of the drawing, looking in a direction longitudinally of a conveyor.

Referring to FIG. 8, oiler 509 incorporates a tank 510, a pump (not shown) a plurality of nozzles mounted on an adjustable nozzle mounting head and finger tip digital oil quantity adjustments, including a BCD switch 512, an on-off switch 514, status lights 516 and a manual spray pushbutton switch 518. Electrical connectors 520 are provided for connection with spray nozzles.

The electrostatic oil sprayer 10 comprises a reservoir 130 containing a supply 132 of liquid connected through conduit 134 to the suction side of pump 135. The pressure side of pump 135 is connected through conduit 136, as illustrated in FIG. 6 of the drawing, to spray valve assemblies 60, 70 and 80, each incorporating an atomizing chamber and spray tip or nozzle 64, 74 and 84, illustrated in FIGS. 1 and 5. The mass of pressurized liquid received from pump 135 is broken up into small droplets by spray tips 64, 74 and 84 and a cone shaped spray having an angle of approximately 80° is dispensed from valves 62, 72 and 82 through nozzles 64, 74 and 84.

Electrodes 22 and 24 are positioned adjacent each nozzle such that the stream of droplets flowing from each nozzle will be directed between and in the vicinity of each of the electrodes 22 and 24.

The potential difference between ionized droplets 146 and pan 112 causes the droplets to be electrically attracted by pan 112 and propelled along a trajectory directly to the surface of pan 112. This electrical attraction of pan 112 to the charged droplet eliminates the possibility of "overspray" which has heretofore resulted from minute spray particles which tend to float in the air and settle on surfaces in the general vicinity of the pan.

The principle of conservation of energy is applicable to the motion of the charged droplets as they impinge against the surface of pan 112. The change in electrical potential energy and the change in kinetic energy of charged droplets 146 is employed to overcome the surface tension of the droplets and spread the droplets on the surface of the pan. By adjusting the speed, direction and potential gradient between the droplets and pan 112, the ability of droplets to wet the surface of the pan to form an unbroken film while eliminating "overspray" is enhanced. Extremely fine particles of the liquid, having a very low mass, are accelerated and, "steered" to pan 112.

Inline heater 93 preferably heats oil in oil line 136 to a temperature range between 50° C. (122° F.) and 95° C. (203° F.) to control the viscosity of the oil solution and to enhance atomizing the oil flowing from valves 62, 72 and 82 and the spray tips 64, 74 and 84. For proper atomization the viscosity of the oil is preferably maintained in a range of about 130 to 150 Saybolt universal seconds.

The stream of liquid exiting spray tips 64, 74 and 84 must have sufficient velocity to atomize the liquid to form droplets but should move as slowly as possible to remain between electrodes 22 and 24 for a sufficient time to permit charging of the droplets. If oil droplets move between electrodes 22 and 24 at a velocity in a range between 10 and 20 meters per second, the droplets 144 will be sufficiently charged.

Figure 4:
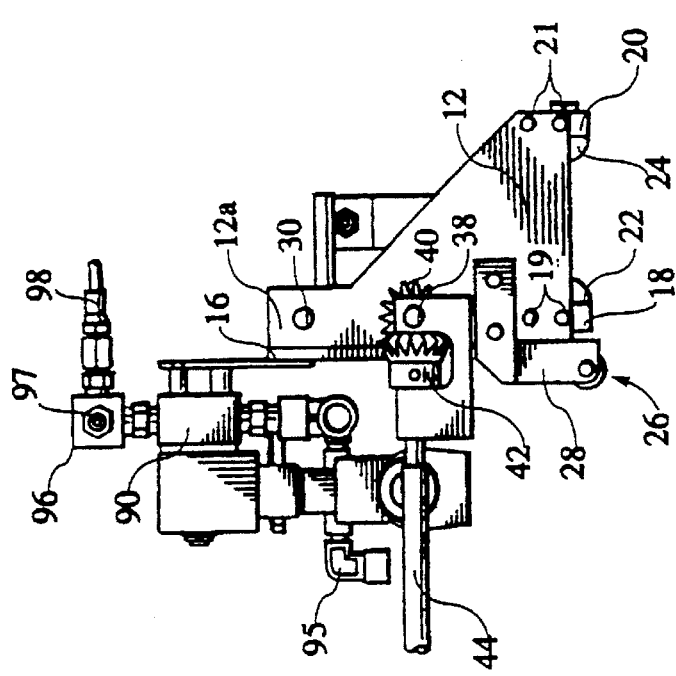
FIG. 4 is a right side elevational view.

Referring to FIGS. 4 and 6 of the drawings, electrodes 22 and 24 for charging conducting cooking oil are charged to an electrical potential in a range between four and ten kilovolts through a conductor 148, and a 100 megohms resistor 149 by an electrical source 150. Electrodes 22 and 24 for charging nonconducting, or dielectric, cooking oil, are charged to a potential in a range between four and six kilovolts, and may be positive or negative.

Electrical source 150 is of conventional design and comprises a transformer and rectifier circuit for converting, for example, 110 volts of alternative current electricity to 5,000 volts direct current. A capacitor 152 is connected from conductor 148 to ground to function as a spark arrester and to prevent injury to operators who might come in contact with the electrodes.

A human body has a representative resistivity of about 100 kilo-ohms. Thin, if an operator contacts electrodes 22 or 24, the electrical charge on the capacitor is dumped and the operator receives about five volts. When the operator moves out of contact with electrode 22 or 24 capacitor 152 will be recharged over a time period of from one to two seconds and the potential of electrodes 22 or 24 will increase to five kilovolts.

It should be readily apparent that the provision of resistor 149 and capacitor 152 in the charging circuit provides a safety device and also prevents electrode arcs to pan 112.

A pan sensor 160 is mounted either below or adjacent a side of conveyor 115 and is adapted to generate a signal through sensor interface cable 122 to indicate the arrival and departure of pans 112, 113 and 114. As will be hereinafter more fully explained, sequence controller 120 and pan sensor 160 control spraying cycles.

Figure 7:
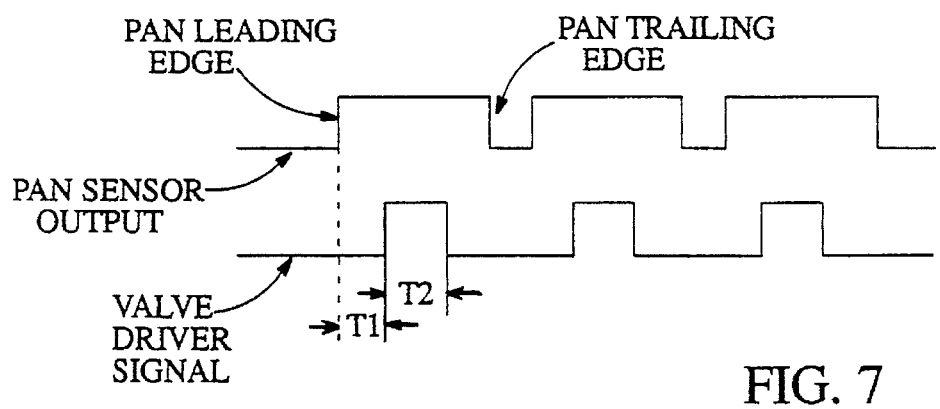
FIG. 7 is a timing diagram of the control system.

A typical timing diagram is illustrated in FIG. 7 of the drawing. Time T1 is the time delay determined by a time delay device between the arrival of the leading edge of the pan 112 and the time when the spraying cycle will be initiated. A time duration device controls the duration T2 during which valve 90 is maintained in an open condition between the time the spray cycle is initiated and terminated. The cycle is repeated as each pan moves into position to be sprayed. It should be readily apparent that control circuit 120 initiates and terminates spraying cycles based on the presence of pans 112, 113, and 114, even though the pans may be irregularly spaced on conveyor 115.

For application of oil to pockets in bun pans where several rows and columns of recesses are formed in a single pan, spray nozzle assemblies 60, 70 and 80 are preferably positioned across the width of conveyor 115 and positioned to spray oil into each recess in the pan. The width of the area sprayed by each nozzle 60, 70 and 80 can be adjusted by moving nozzles 64, 74 and 84 either toward or away from conveyor 115 such that the width of the area sprayed by the spray pattern will be increased as the nozzles are moved away from conveyor 115 and decreased as the nozzles are moved toward conveyor 115.

Pan sensor 160 may assume any suitable configuration. In the embodiment illustrated in FIGS. 6 and 8 of the drawing, pan sensor 160 comprises a microswitch which is opened and closed by the bottom of pans 112, 113, and 114 to find the leading edge of each cavity which is to be sprayed.

Pan sensor 160 may assume other and further configurations, including an optical sensor (not shown) which may be used where bottom sensing is not possible or practical or where magnetically actuated microswitches cannot be used if pans or other products are not metallic. In an optical sensor, an optical beam is directed between an infrared transmitter and an infrared receiver mounted adjacent opposite sides of conveyor 115. The optical beam is broken by cups formed in pans 112, 113, and 114. If the sprayer is used as a water splitter or butter applicator, the sensor 160 is preferably an optical sensor to detect non-metallic objects.

The sequence controller generally designated by the numeral 120 in FIG. 6 of the drawing is a self contained, microprocessor based unit which provides a user programmable sequence of electronic pulses for the control or synchronization of valves, relays, solenoids, and timers. Each pulse sequence is initiated either by an external sensor 160 or by a front panel switch. The sequence controller 120 allows a single sensor pulse or switch closure to trigger a series of evenly timed events. The sequence controller is housed in an enclosure which can be readily mounted to oiler 10 or conveyor 115. It is connected in-line between the pan sensor 160 and the oiler 10 by sensor interface connector cable 122 and output interface cable 124, respectively. The controller 120 uses the low voltage DC power provided by the oiler 10 for sensor operation and, therefore, does not require external power input.

Front panel switches allow the operator to control three main parameters of the sequence: DELAY TIME, REPEAT TIME, and NUMBER OF PULSES.

The three remaining front panel controls of the Sequence Controller allow the operator to manually trigger a pulse sequence, stop a pulse sequence which is in progress, bypass the controller with the sensor signal, or turn off the controller output.

From the foregoing it should be readily apparent that the sequence controller 20 hereinbefore described is particularly adapted for controlling one or more spray nozzles for providing precise control of the application of oil films to the surfaces of a pan or to the surface of products carried in the pans, or to the surface of products carried on the conveyor 115. The use of electrostatic sprayer assembly 10 in a pan oiler provides precision control of both the spraying and the distribution of droplets of liquid release agent or other coatings which is particularly adapted for use in commercial bakery and food service operations. Rotation of crank handle 45 facilitates positioning nozzle assemblies 70 and 80 in desired locations.

The spray system 10 incorporates three nozzle assemblies 60, 70 and 80 with separate valves 62, 72 and 82 and separate straight spray tips 64, 74 and 84. This nozzle configuration allows exacting oil spray in a wide variety of pan configurations. This particular nozzle assembly utilizes a WD-A4 80° hollow cone nozzle tip. However, other tips may be used for other applications.

The three nozzle valves 62, 72 and 82 may be actuated by the same signal from the oiler if each valve is to be open for the same time period. Therefore each individual cavity of the bread pan receives three actual separate cone-shaped sprays from this nozzle assembly.

The two outside nozzle assemblies 70 and 80 are adjustable in their relationship to the center nozzle 60. This adjustment is incorporated to facilitate adjusting the nozzle assemblies 70 and 80 for a variety of different pan lengths. The relationship of the two outside nozzle assemblies 70 and 80 to the center nozzle 60 is adjusted by the use of a crank handle 46 on a shaft 44.

The bevel gear 40 matches with an opposing 90° bevel gear which turns at the same rate for transferring the movement to a 90° angle. This movement is transferred through the gear box into the nozzle assembly itself where one drive screw 35 is right hand threaded on one end 34 and left hand threaded on the other end 36. This action of rotation will keep the spacing between the center nozzle 60 and the two outside nozzles 70 and 80 the same on each end.

A chain sprocket 48 is attached to the crank adjusting shaft 44 and by chain 47 and sprocket 49 to a mechanical counter 50 with a digital readout. The readout will allow the operator to make repetitive settings for each pan. A chart or listing can be formulated by the operator so that he knows each day what setting to set for a particular pan being used.

It should be apparent that the embodiment disclosed herein may be modified without departing from the spirit and scope of the following claims.

We claim:

1. Apparatus for applying a film of cooking oil to a pan surface comprising: a source of electrically non-conductive cooking oil; a frame; a pair of horizontally spaced elongated electrodes on said frame; a plurality of nozzle assemblies on said frame adjacent said electrodes connected to said source of cooking oil; conveyor means adjacent said nozzle assemblies for moving pans adjacent said nozzle assemblies, said electrodes extending transversely of said conveyor and said nozzle assemblies being positioned between said electrodes; means electrically charging said electrodes to a potential, each said nozzle assembly projecting droplets of liquid between said spaced elongated electrodes at a velocity such that said droplets become electrically neutral polarized droplets; and a pan guide roller on said frame for positioning each said nozzle assembly and said spaced electrodes adjacent the pan surface, said nozzle assemblies projecting droplets of liquid between said electrodes to propel the electrically neutral polarized droplets along a trajectory to impinge against surfaces of a pan on said conveyor means.

2. Apparatus for applying a film of cooking oil to a pan surface according to claim 1, wherein said nozzle assemblies project droplets at a velocity in a range between ten and twenty meters per second along a trajectory to impinge against an oppositely charged pan surface at an angle to cause the droplets to spread over the pan surface and to be retained in contact therewith as an electrical charge on droplets is dissipated.

3. Apparatus for applying a film of cooking oil to a pan surface according to claim 1, said frame being constructed of non-conductive material.

4. Apparatus for applying a film of cooking oil to a pan surface according to claim 1 with the addition of: means for moving at least two nozzle assemblies in unison relative to another nozzle assembly.

5. Apparatus for applying a film of cooking oil to a pan surface according to claim 1, with the addition of: control means adjacent said conveyor means, said control means actuating said nozzle assemblies when a pan moves along said path to a predetermined location and de-energizing said nozzle assemblies when the pan moves away from a predetermined location.

6. Apparatus for applying a film of cooking oil to a pan surface according to claim 5, said control means comprising pan sensing means adjacent said conveyor means, said pan sensing means generating a signal when a pan is moved by said conveyor means to a predetermined position; and a driver means operatively connected with said nozzle assemblies and said pan sensing means for initiating and terminating flow of cooking oil through said nozzle assemblies.

7. Apparatus for applying a film of oil to a pan surface comprising: a source of oil; a plurality of elongated horizontally spaced electrode means, each electrode means having a curved surface; atomizing means adjacent said elongated horizontally spaced electrode means and operably connected with said source of oil for spraying oil droplets between said elongated horizontally spaced electrode means; means charging each of said curved surfaces on said spaced electrode means to an electrical potential to electrically polarize electrically neutral oil droplets sprayed between said spaced electrode means; a pan guide roller for positioning a pan adjacent said elongated horizontally spaced electrode means such that said electrically neutral polarized droplets moving between said spaced electrode means will move along a path toward the pan; means sensing the presence of a pan moving along a path adjacent said electrode means; means energized by said sensing means for actuating said atomizing means when a pan is positioned adjacent said electrode means; and spark arrester means electrically connected with each of said plurality of elongated horizontally spaced electrode means, said spark arrester means preventing electrical arcing between said electrode means and the pan.

8. Apparatus for applying a film of oil to a pan surface according to claim 7, wherein each of said elongated horizontally spaced electrode means is constructed of a polycarbonate conductive plastic material.

9. A pan oiler for spraying oil into cavities in pans moving on a conveyor comprising: a frame mounted adjacent the conveyor; a center nozzle assembly on said frame; first and second outside nozzle assemblies mounted on said frame; a drive screw mounted on said frame and connected to said first and second outer nozzle assemblies, said drive screw having right hand and left hand threads for moving said first and second outside nozzle assemblies in unison relative to said center nozzle assembly; a source of fluid connected to said nozzle assemblies for delivering atomized fluid into cavities in pans moving on the conveyor and a pan guide roller on said frame for positioning each said nozzle assembly relative to the pans moving on the conveyor.

10. A pan oiler according to claim 9, with the addition of a gear box connected to said drive screw; a shaft connected to said gear box; and a crank on said shaft, said crank being rotatable for moving said first and second outside nozzle assemblies relative to said center nozzle assembly.

11. A pan oiler according to claim 9, with the addition of spaced electrodes on said frame, said electrodes being electrically charged and positioned to establish an electric field in a path between said nozzle assemblies and the pan surface.

* * * * *